(12) United States Patent  
Dhuria et al.

(10) Patent No.: US 9,405,882 B1  
(45) Date of Patent: Aug. 2, 2016

(54) HIGH PERFORMANCE STATIC TIMING ANALYSIS SYSTEM AND METHOD FOR INPUT/OUTPUT INTERFACES

(71) Applicant: CADENCE DESIGN SYSTEMS, INC., San Jose, CA (US)

(72) Inventors: Amit Dhuria, Uttar Pradesh (IN); Naresh Kumar, Uttar Pradesh (IN); Prashant Sethia, Uttar Pradesh (IN); Jeannette Sutherland, Cedar Park, TX (US); Shashank Tripathi, Uttar Pradesh (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/752,206

(22) Filed: Jun. 26, 2015

(51) Int. Cl.  
*G06F 17/50* (2006.01)

(52) U.S. Cl.  
CPC ........ *G06F 17/5081* (2013.01); *G06F 17/5031* (2013.01); *G06F 2217/84* (2013.01)

(58) Field of Classification Search  
CPC .................................................. G06F 17/5031  
USPC .................. 716/100, 106, 108, 110–111, 113  
See application file for complete search history.

(56) References Cited

U.S. PATENT DOCUMENTS

| | | | |
|---|---|---|---|
| 6,629,293 B2 * | 9/2003 | Chang | G06F 17/5022 716/103 |
| 8,863,052 B1 * | 10/2014 | Dhuria | G06F 17/5036 716/108 |

* cited by examiner

*Primary Examiner* — Stacy Whitmore  
(74) *Attorney, Agent, or Firm* — Kaye Scholer LLP (57) ABSTRACT

A static timing analysis method for input/output modes of an integrated circuit design, that includes loading the integrated circuit design described in a hardware description language into a memory. An active zone for static timing analysis is defined, which comprises logic and interconnect between an input/output port and a selected level of sequential logic elements upstream from an input port and downstream from an output port. A description of the active zone is generated using the hardware description language. Then a static timing analysis is performed on the logic of the active zone.

19 Claims, 7 Drawing Sheets

HIGH PERFORMANCE STATIC TIMING ANALYSIS SYSTEM AND METHOD FOR INPUT/OUTPUT INTERFACES

FIELD

This patent document relates generally to the static timing analysis (STA) of integrated circuit (IC) designs prior to fabrication. In particular, the present patent document relates to systems and methods of high performance multi-mode/multi-corner (MMMC) and single-mode/multi-corner (SMMC) solutions for input/output (I/O) mode STA runs.

BACKGROUND

In complementary metal oxide semiconductor (CMOS) technologies, process variations during manufacturing have a significant impact on circuit performance, such as timing. The effect of these variations worsens as minimum feature sizes scale down and as circuit complexity and die sizes increase. In many of today's integrated circuit design implementation flows, variability in devices and interconnects is modeled by timing analysis and optimization of a design at multiple process corners.

Generally speaking, timing analysis calculates circuit timing delays and ensures that those delays are within bounds as specified by user constraints. There are two major types of timing analyses, namely, static timing analysis (referred to as "STA") and dynamic timing analysis. Static timing analysis calculates the individual delays associated with different portions of a circuit and then generates a report detailing the minimum and maximum delays associated with each possible path and whether those delays meet user constraints. On the other hand, dynamic timing analysis typically specifies an event that may occur sometime within a certain time period and then determines the timing along different paths of the circuit in response to the event.

In conventional static timing analysis, models at various process corners have significant pessimism built into them. Generally speaking, pessimism refers to the extra timing margin (e.g., extra delay margin) added to make it more likely that a device in the circuit is going to satisfy specified timing requirements. As the built-in pessimism of the models is reduced, the reported worst-case timing slack for the circuit typically improves.

With shrinking technology, timing closure has become difficult because it is now possible to pack more functionality on a smaller die, resulting in multiple modes of running the chip. In addition to multiple modes, process variations may require multiple corners, and complex architecture may require multiple modes to be analyzed, and as a result the timing closure in all the corners has become a very time-consuming process. With new technologies like multi-mode multi-corner (MMMC) analysis, the whole process of timing closure has become overly exhaustive, time consuming, and costly.

A typical chip has large number of input/output ("I/O") interfaces, for example, audio, serial, or Ethernet. However, not all interfaces can be analyzed together or under the same conditions. Port multiplexing may be performed to achieve different functionalities in different I/O modes. The same port may get different delay constraints, case values, clock or data signals depending on the I/O mode.

Many design configurations have a large number of I/O modes. Indeed, there are often more I/O modes than functional modes. Users of STA tools generally understand this and try to reduce the amount of STA work needed in various ways, such as by merging modes to reduce number of I/O modes, or by trying to add some internal register-to-register constraints to disable timing along certain paths.

These user-driven approaches are common and provide some usefulness, but current timing tools are still limited in that they are not tailored to limit the analysis to an active zone of timing paths only, and instead still require a full STA analysis. Moreover, these user-driven approaches are overly complex and have multiple problems. Specific user-driven approaches involve constraint sets that are much more complex and which degrade performance. For example, such user-driven approaches use too many extra constraints (for example, setting false paths, setting clock groups, clock duplication) to attempt to disable the non-I/O network. This manual intervention from the user is also prone to errors that result in either missing constraints or applying the wrong constraints, which may disable real I/O paths. Current user driven approaches also require a large amount of constraint debugging ability to attempt to ensure the correctness of the manual constraint generation. These approaches suffer a further drawback in that the timing tool is not aware of user's real intent and hence still proceeds with a complete loading of the design loading, complete loading of parasitic information (usually in the form of "Standard Parasitic Exchange Format," or "SPEF"), delay calculation, and/or analysis of the full design resulting in an overly large number of MMMC views. In addition, user reporting scripts becomes too complex as they try to use too many I/O group_path constraints or use complex report_timing commands (using report_timing-from/through/to option) to focus on I/O paths only.

As digital circuit components have gotten smaller, the number of process corners has increased exponentially, now often ranging from 10-20 corners or more per analysis mode. With this increased number of corners, full chip analysis for all the modes may become unworkable as a large number of STA runs have a large bearing on design timing closure cycle. The increased number of corners can also lead to a larger number of design changes since the number of variables affecting timing have increased.

Also, analyzing signal integrity ("SI") effects during a large number of STA cycles adds another performance bottleneck to the system analysis. Chip designers typically do not run SI analysis for all I/O modes because they do not have sufficient time in their design cycle. Instead chip designers tend to put high guard bands (timing derates) to add pessimism that can cover SI effects. However, this can have a bearing on the overall quality of results of the design.

Although the present methods are useful to a degree, there still exists a need in the field for reduced runtime, reduced error, and reduced memory STA runs. Thus, for at least these reasons there is a need for more accurate and efficient methods and systems for MMMC STA runs for I/O modes.

SUMMARY

Systems and methods of high performance multi-mode/multi-corner (MMMC) solutions for input/output (I/O) mode STA runs, are disclosed and claimed herein.

To this end, systems and methods of high performance multi-mode/multi-corner (MMMC) solutions for input/output (I/O) mode STA runs are provided. In particular, a computer implemented static timing analysis method for input/output modes of an integrated circuit design is disclosed, which comprises loading the integrated circuit design into a memory of a computing device, wherein the integrated circuit design is described in a hardware description language. An active set of input ports and an active set of output ports is received. An active zone of the integrated circuit design is defined, wherein the active zone comprises logic and interconnect between the active set of input ports, the active set of output ports and a selected level of sequential logic elements upstream from the active set of input ports and downstream from the active set of output ports. The active zone excludes functional logic between the selected level of sequential logic elements upstream from the input port and downstream from the output port. A description of the active zone is generated using the hardware description language. Static timing analysis is run on the logic of the active zone.

In another aspect, the generating step comprises modifying the integrated circuit design by deleting interconnect and logic that are not within the active zone.

In another aspect, the generating step comprises ignoring interconnect and logic that are not within the active zone.

In another aspect, one of the active set of input ports or the active set of output ports of the integrated circuit design is selected to be analyzed.

In another aspect, timing data only for the active zone is loaded into the memory of the computing device, wherein the timing data comprises parasitic information and user constraints.

In another aspect, the selected level of one or more sequential elements comprises the first one or more sequential elements nearest the active set of input ports and the active set of output ports.

In another aspect, the active set of input ports comprises an input port that is a first point in a timing path and comprises a first sequential element that is an endpoint of the timing path.

In another aspect, the active set of input ports comprises an input port that is a first point in a timing path and comprises a first sequential element and a second sequential element, where the second sequential element is an endpoint of the timing path.

In another aspect, the active set of output ports comprises an output port that is an endpoint in a timing path and comprises a first sequential element that is a starting point of the timing path.

In another aspect, the static timing analysis comprises a multi-mode, multi-corner static timing analysis.

In another aspect, the static timing analysis comprises a single-mode, multi-corner static timing analysis.

In another aspect, a system that performs static timing analysis on input/output modes of an integrated circuit design is disclosed. The system comprises a workstation having a central processing unit and memory that stores an integrated circuit design. The integrated circuit design is described in a hardware description language.

The central processing unit is programmed to receive an active set of input ports and an active set of output ports. The central processing unit is also programmed to define an active zone of the integrated circuit design. The active zone comprises logic and interconnect between the active set of input ports, the active set of output ports and a selected level of sequential logic elements upstream from the active set of input ports and downstream from the active set of output ports. The active zone excludes functional logic between the selected level of sequential logic elements upstream from the input port and downstream from the output port;

The central processing unit is also programmed to generate a description of the active zone using the hardware description language and to run a static timing analysis on the logic of the active zone.

In another aspect, the central processing unit is programmed to delete the interconnect and logic of the integrated circuit design that are not within the active zone.

In another aspect, the central processing unit is programmed to ignore interconnect and logic that are not within the active zone.

In another aspect, the central processing unit is programmed to load timing data only for the active zone into the memory of the workstation. The timing data comprises parasitic information and user constraints.

In another aspect, the selected level of one or more sequential elements comprises the first one or more sequential elements nearest the active set of input ports and the active set of output ports.

In another aspect, the active set of input ports comprises an input port that is a first point in a timing path and comprises a first sequential element that is an endpoint of the timing path.

In another aspect, the active set of input ports comprises an input port that is a first point in a timing path and comprises a first sequential element and a second sequential element. The second sequential element is an endpoint of the timing path.

In another aspect, the active set of output ports comprises an output port that is an endpoint in a timing path and comprises a first sequential element that is a starting point of the timing path.

These and other objects, features, aspects, and advantages of the embodiments will become better understood with reference to the following description and accompanying drawings.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

A method and apparatus for performing multi-mode, multi-corner I/O mode STA runs is disclosed. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm may be here, and generally, conceived to be a self-consistent sequence of steps leading to a desired result. The steps may be those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also disclosed is an apparatus for performing the operations herein. This apparatus may be specially constructed for the required purposes, or it may comprise a general purpose computer workstation having a central processing unit and memory that is selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, or any type of media suitable for storing electronic instructions, and each coupled to a computer system bus.

Any algorithms that may be presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Static timing analysis is a method to assess the timing of a digital circuit using software techniques and certain models that provide relevant characteristics of the digital circuit. The various embodiments described in this patent document segregate STA into two categories, functional STA and I/O mode STA. By treating functional STA and I/O mode STA separately, efficiency is increased. Efficiency is increased because the zone of active network for an I/O mode is relatively small as compared to the full chip design. Thus, a STA tool can leverage this to build a timing graph that proportionally cuts down memory and runtime requirements with the size of the active zone. For example, analysis has determined that in most designs, one I/O mode can cover less than five percent of the design.

Figure 1:
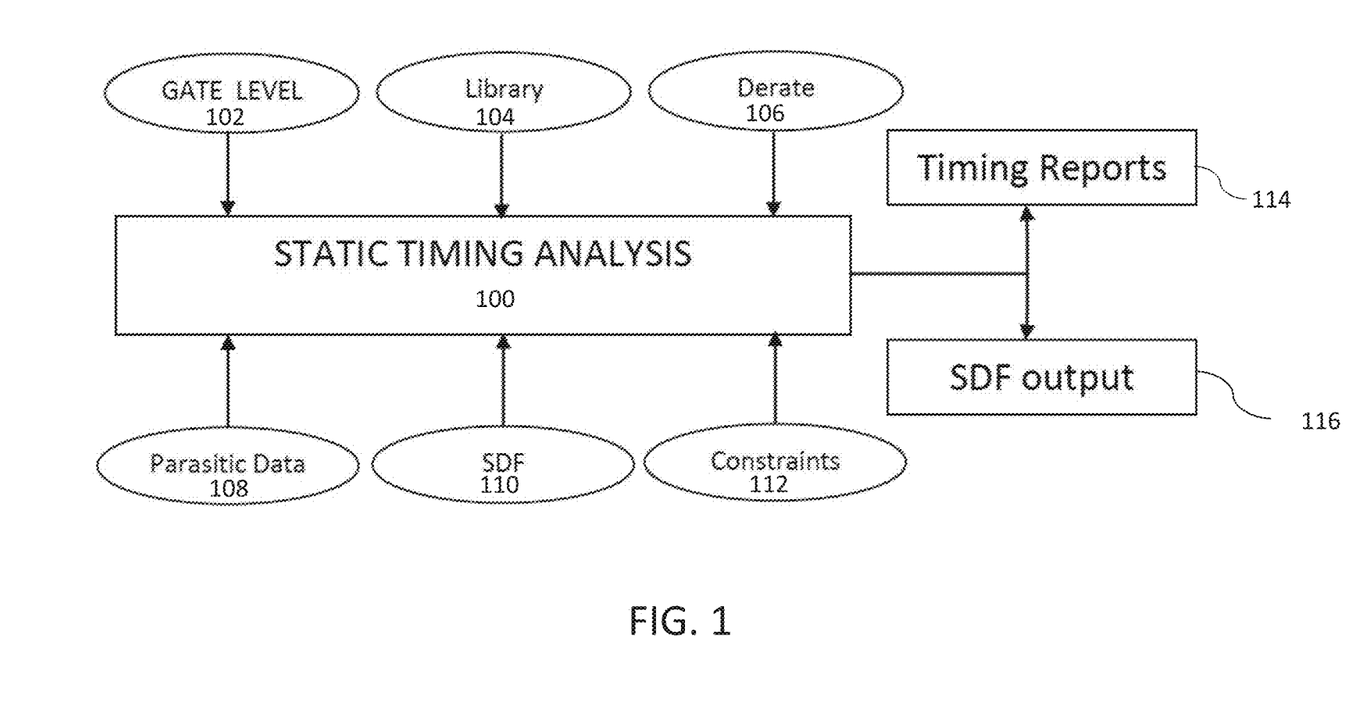
FIG. 1 illustrates the input models necessary for static timing analysis.

FIG. 1 shows typical inputs to a STA tool 100. Inputs include a gate level netlist 102, which is a model defining components and their connections for the digital circuit being tested. Library 104 includes the timing models required to perform STA. An exemplary library model 104 is known as Liberty format, which contains models defining the delays of standard logic gates, e.g., AND, OR, NOT, Flip Flop, and Latch, as well as models for chip variation and signal integrity. Derate data 106 are modifications to delays and other values provided by a user that take into account various performance issues such as known process variations. Standard delay format, or SDF, 110 specifies input delays of gates and interconnect and generally conforms to a standard format. Constraints 112 define the desired timing that the user defines. The output of the STA tool 100 can be a timing report 114 and/or a file in SDF format 116.

Figure 2:
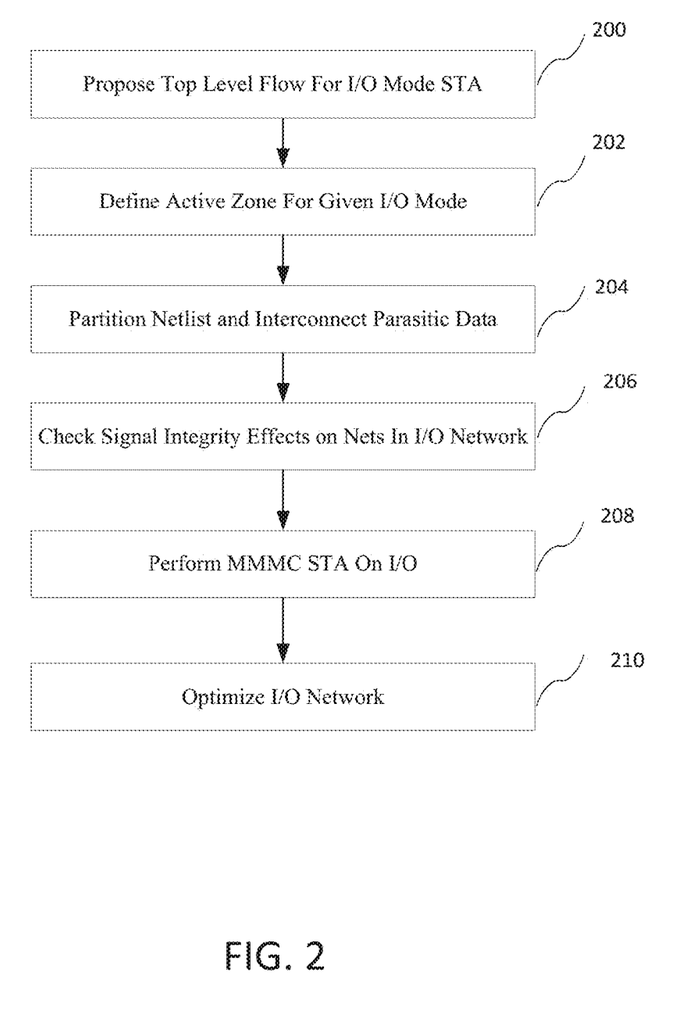
FIG. 2 is a flow chart showing implementation of a multi-mode, multi-corner static timing analysis for I/O portions of a circuit design.

FIG. 2 shows a high-level flow chart of the operation of the MMMC I/O STA methods described herein. At step 200, the top level flow for an I/O mode STA run is defined. When defining the top level flow, the user's specifications regarding the MMMC static timing analysis are read-in. The user's specifications identify, i.e., mark, the active set of input and output ports for which the user wishes to run I/O mode STA. The user also has the option to mark all the input and output ports as active. The user's specifications also specify the number of register levels (which are discussed below) that should be considered as active so that I/O mode STA is performed only on the level of I/O logic desired. In one embodiment, an I/O mode static timing analyzer can set the default to one level of registers. The concept of register levels is discussed below in the context of FIGS. 3-5. In addition, step 200 can allow the user to specify logic blocks within the paths that will be included in the static timing analysis.

At step 202, the active zone for a given I/O mode is defined based on the information provided in step 200, which will be discussed in more detail below. At step 204, the netlist and SPEF (i.e., parasitic) data is partitioned, which reduces the design size for a given I/O mode. At step 206, signal integrity effects in the I/O network are checked. At step 208, the MMMMC static timing analysis is performed on the I/O. Finally, at step 210, the user can change the design of the I/O network, if desired, to optimize the timing of the circuitry.

An I/O mode is either the set or subset of interface paths connected to input and output ports on a chip design to be tested during STA. In use, as discussed a user of the static timing analysis tool marks the input ports and output ports of interest which assists in selecting the active zone for static timing analysis (step 200 in FIG. 2). To perform STA on an I/O mode, the active zone for a given mode must be determined, which is what is done in step 202. I/O paths are defined as Level One paths and Level Two paths. One form of Level One path is the logic in between an input port to a first level sequential logic element. A second form of Level One path is the logic in between an output port and first level sequential logic element. A Level Two path includes all the logic and interconnect between a first level sequential logic element and a second level sequential logic element, as will be discussed. Note that in the embodiments described herein, only Level One and Level Two paths are used for the STA. However, using additional path levels might be appropriate in certain circumstances.

Figure 3:
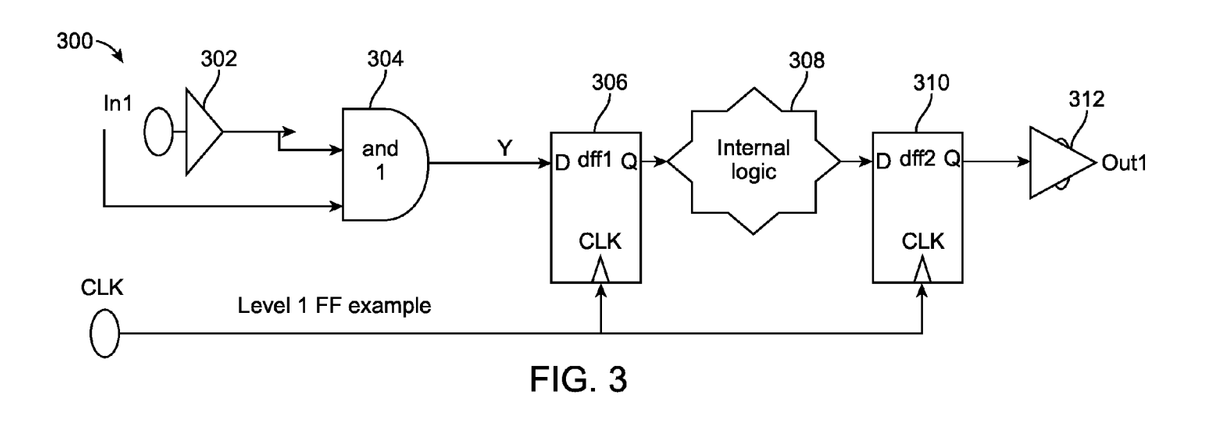
FIG. 3 shows the identification of an exemplary Level One circuit path.
Figure 4:
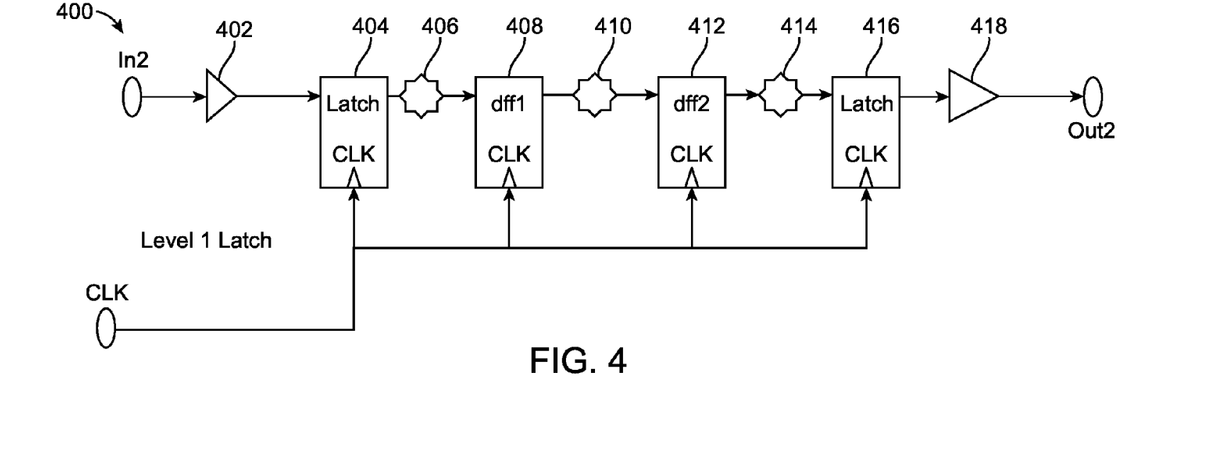
FIG. 4 shows the identification of exemplary Level One circuit path with latches.

The manner in which Level One paths are defined is shown in the examples of FIGS. 3-4. In FIG. 3, a circuit 300 is shown which has a first Level One path comprising buffer 302, AND gate 304 and the interconnect since this logic and interconnect is in between input in1 and Flip Flop 306. Thus, the Level One path contains combinatorial logic and interconnect upstream from input In1 that feeds Flip Flop 306. This cone of logic, i.e., the fan in to Flip Flop 306 (the logic and interconnect between In1 and the input to Flip Flop 306) will be an active zone for performing static timing analysis. Flip Flop 306 can be considered a first level sequential logic element. Likewise, circuit 300 has a second Level One path between the output of Flip Flop 310 and output Out1, which in this example comprises buffer 312 and the interconnect. Thus, second Level One path includes combinatorial logic downstream from output Out1 and the output of Flip Flop 310. This cone of logic, i.e., the fan out of Flip Flop 310 (the logic and interconnect between the output of Flip Flop 310 and Out1) will also be an active zone for performing static timing analysis. Flip Flop 310 can be considered a first level sequential logic element. Internal logic 308 is not part of the active zone, and will not have and static timing analysis performed on thereon during the I/O mode STA process. Internal logic 308 contains the logic between the first level sequential logic element at the input and the first level sequential logic element at the output, and is not necessary for input/output mode static timing analysis. Therefore, the active zone for STA will exclude functional logic between the selected level of sequential logic elements upstream from the input port and downstream from the output port since they are not part of the active zone. Thus, for the data upon which STA is formed, internal logic 308 can either be deleted or marked to be ignored.

FIG. 4 shows circuit 400 having different types of Level One paths. In particular, circuit 400 has a latch 404 within the Level One path between the input In2 and the input to Flip Flop 408. Thus, this particular Level One path includes buffer 402, latch 404, combinatorial logic network 406 and all interconnect upstream from In2 to the input to Flip Flop 408. This cone of logic, i.e., the fan in to Flip Flop 404 (the logic and interconnect between In2 and the input to FLIP FLOP 408) will be an active zone for performing static timing analysis. Flip Flop 408 can be considered a first level sequential logic element.

Likewise, circuit 400 has a second Level One path between the output of Flip Flop 412 and output Out2, which in this example comprises buffer 418, latch 416, combinatorial logic network 414 and interconnect downstream from Out2. Thus, second Level One path includes combinatorial logic upstream from output Out2, latch 416 and the output of Flip Flop 412. This cone of logic, i.e., the fan out of Flip Flop 412 (the logic and interconnect between the output of Flip Flop 412 and Out2) will also be an active zone for performing static timing analysis. Flip Flop 412 can be considered a first level sequential logic element.

Flip Flop 408 outputs signals to internal logic 410. Just as with internal logic 308, internal logic 410 is not part of the active zone for I/O STA, and thus will not have static timing analysis performed thereon. Internal logic 410 contains the logic between the first level sequential logic element at the input and the first level sequential logic element at the output, and is not necessary for input/output mode static timing analysis. Therefore, the active zone for STA will exclude functional logic between the selected level of sequential logic elements upstream from the input port and downstream from the output port since they are not part of the active zone. Thus, for the data upon which STA is formed, internal logic 410 can either be deleted or marked to be ignored. Note that latches in a pipeline will always be included in the Level One path since latches can remain active for high and low logic levels.

Figure 5:
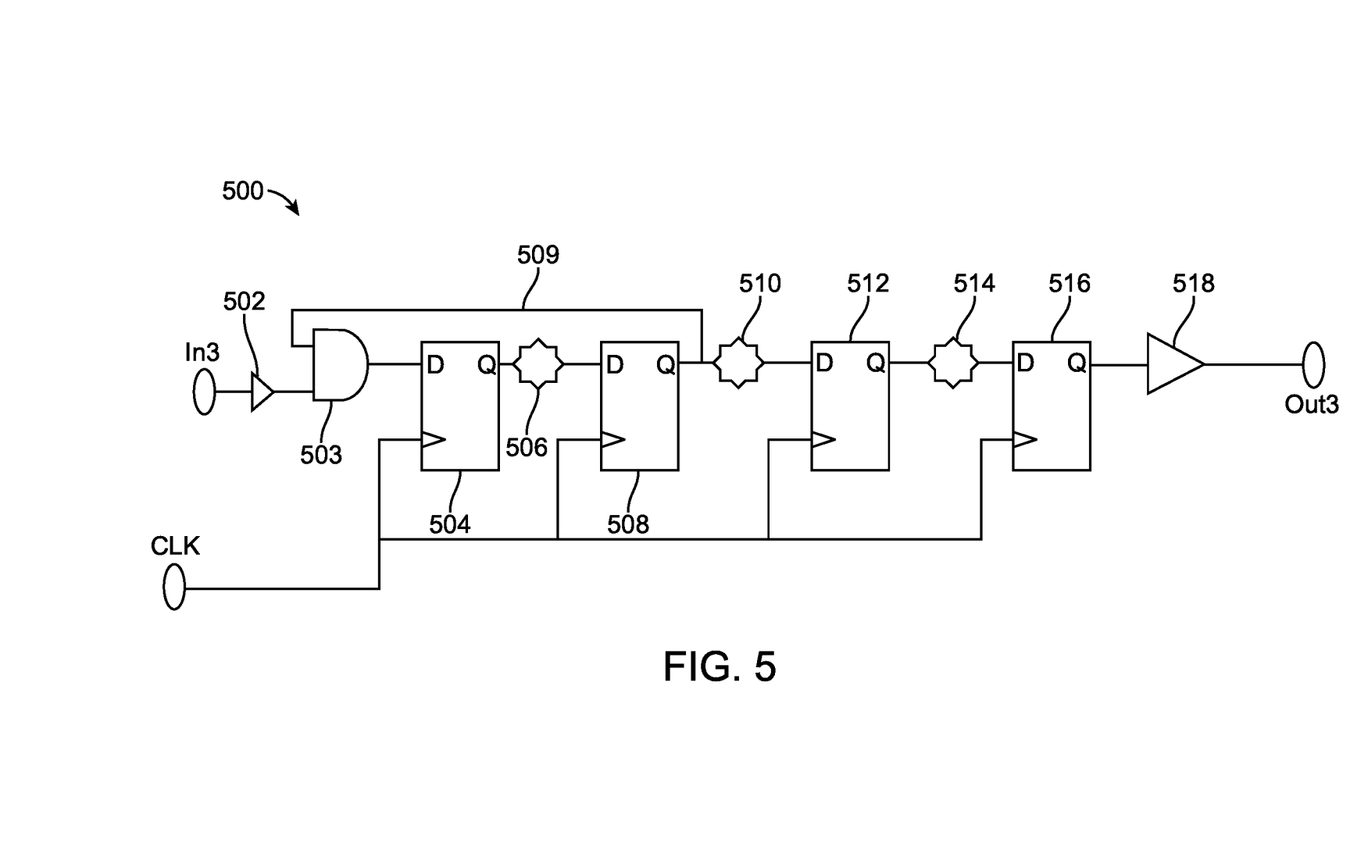
FIG. 5 shows the identification of exemplary Level One and Level Two circuit paths.

Certain I/O timing paths are known as "retiming" paths. An exemplary retiming path loops a circuit's internal clock back to the input or output port. This looped back clock feeds first level register, while a second level register is directly connected to internal clock. In certain circumstances, this circuit path comprising the first level register and the second level register should have STA performed thereon. An exemplary circuit 500 having Level Two paths is shown in FIG. 5. In particular, Level One path comprises interconnect, buffer 502 and AND gate 503 since this interconnect and logic is between input In3 and the input to Flip Flop 504. Flip Flop 504 can be considered a first level sequential logic element. A Level Two path comprises interconnect and combinatorial logic network 506 since they are between the output of Flip Flop 504 and the input to Flip Flop 508. Flip Flop 508 can be considered a second level sequential logic element. The output Q of Flip Flop 508 also fed back to the D input of Flip Flop 504 through an input to AND date 503 through loop back 509.

Similar to the above, circuit 500 contains an additional Level One path that is comprised of interconnect and buffer 518. Buffer 518 is a Level One path because it is located between the output of Flip Flop 516 and output Out3. Flip Flop 516 can be considered a first level sequential logic element. In circuit 500, combinatorial logic network 514 and interconnect comprise a Second Level path since they are between the output of Flip Flop 512 and the input to Flip Flop 516. Flip Flop 512 can be considered a second level sequential logic element Combinatorial logic network 510 and the interconnect are not part of the active I/O zone.

It should be noted that whether STA need be performed for Level Two paths is dependent on the design, and in any case, is unlikely to be necessary on the majority of I/O ports of a design. Only those Level Two paths that will be active for a particular I/O mode should have any STA performed thereon. Likewise, for a particular STA run, the only portion of the I/O clock network that is part of active I/O mode network should have a STA run performed thereon.

Figure 6:
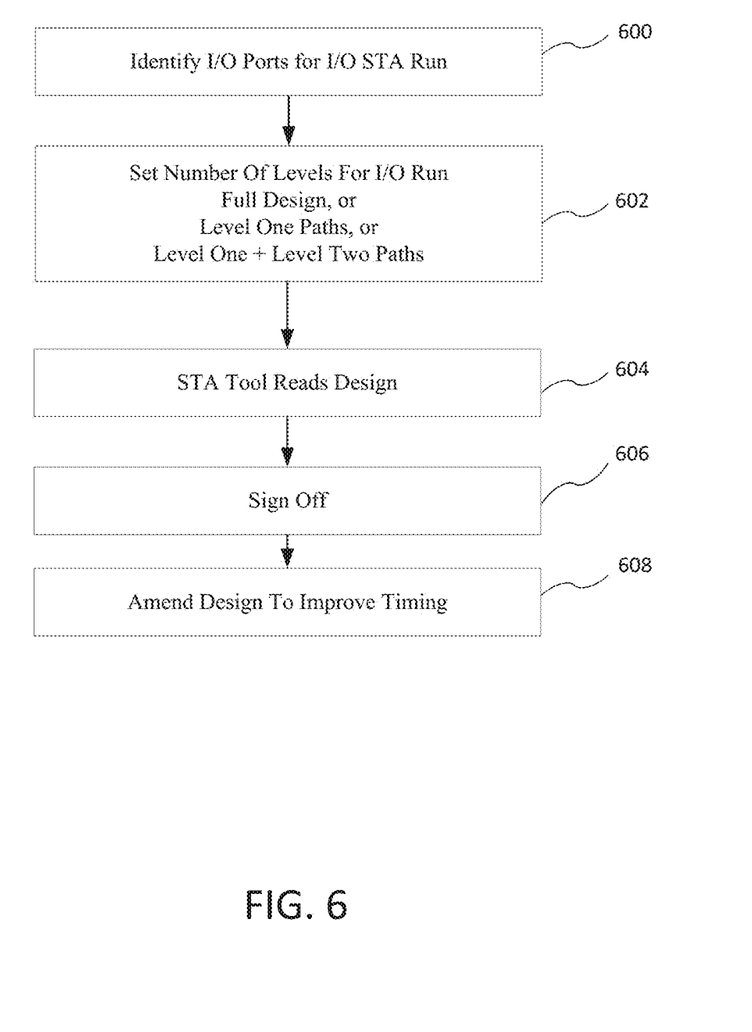
FIG. 6 is a flow chart showing implementation of a multi-mode, multi-corner static timing analysis for I/O portions of a circuit design.

FIG. 6 is a flow chart showing, at a high level, how the teachings described herein fit into a standard SMMC/MMMC STA methodology. In particular, additional steps are performed prior to actual timing analysis. At step 600, the user will identify the I/O ports for which STA will be performed. Then, at step 602, the user will set the number of levels of the I/O circuitry for which SMMC/MMMC STA will be performed. A user can choose to perform SMMC/MMMC STA on the full design, in which case the benefits provided by the teachings herein will not be realized. However, the user can also choose to have SMMC/MMMC STA performed on either Level One I/O paths or on both Level One and Level Two I/O paths. Together, steps 600 and 602 define the active zone which will have SMMC/MMMC STA performed thereon. After the active zone for I/O SMMC/MMMC STA is identified, at step 604, the STA tool reads the design, which includes receipt of the information illustrated in FIG. 1. Thereafter, at step 606, the user can perform timing signoff. Finally, at step 608, the user can amend the design, if desired, to improve timing performance or meet the timing specifications.

Figure 7:
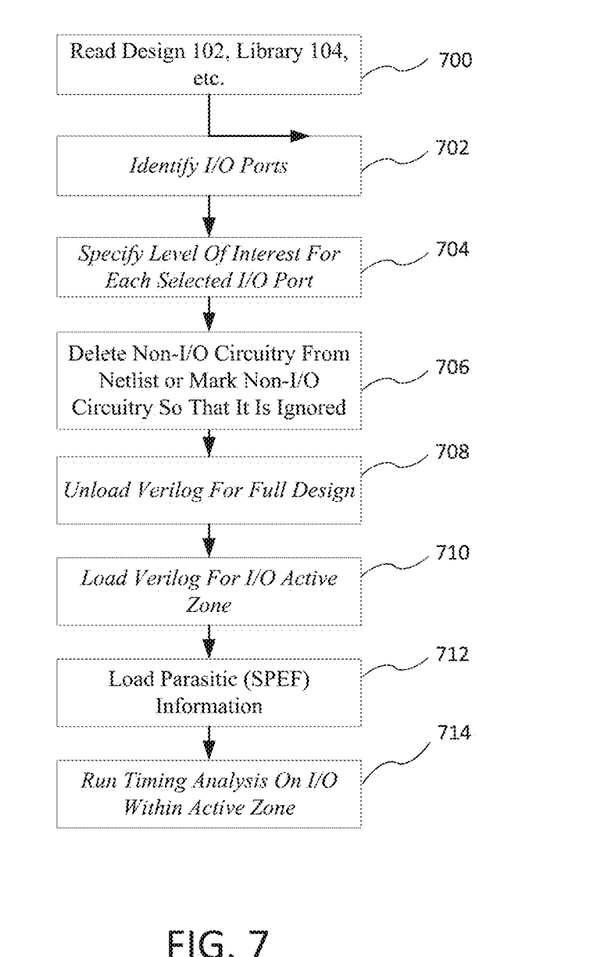
FIG. 7 is a flow chart showing implementation of a multi-mode, multi-corner static timing analysis for I/O portions of a circuit design and how it is integrated into a standard static timing analysis workflow.

FIG. 7 is a flowchart showing how a standard STA tool is modified to implement the various teachings described herein, and provides additional detail to the process shown in FIG. 6. Steps that are italicized are new steps that are not necessary for SMMC/MMMC STA of a full design. As seen in FIG. 4, in step 700, the gate level netlist 102 and library 104 are read. Since full chip STA is not going to be performed on this netlist 102, the user need not load all of the timing related attributes (shown in FIG. 1). Then, at step 702, the active zone for SMMC/MMMC STA is identified by the user. Step 702 is equivalent to step 600 discussed with respect to FIG. 6. As part of the identification of the active zone, the user specifies, in step 704, the levels of interest, i.e., Level One or Level One and Level Two paths. Step 704 is equivalent to step 602 in FIG. 6. After the active zone for I/O SMMC/MMMC STA is determined, the tool, at step 706, deletes the interconnect as well as the combinatorial and sequential logic gates in the netlist 102 that are not part of the active zone for I/O SMMC/MMMC STA. This is generally performed by modifying the Verilog or other hardware description language (HDL) netlist, and ensures that the endpoints of the circuit paths that are not Level One or Level Two paths are ignored during STA runs. Alternatively, the interconnect, combinatorial logic and sequential logic not part of the active zone can be marked to be ignored.

In step 708, the netlist, e.g., Verilog, for the full design is unloaded. Then, in step 710, the modified netlist generated in step 706, also usually in Verilog, is loaded. Modifying the netlist to remove non-I/O circuit paths results in a significantly smaller database, and hence less memory usage in the workstation in which SMMC/MMMC STA is performed. After the modified netlist is loaded, the parasitic information is loaded in step 712, which is usually in the form of a SPEF database. Note that the amount of parasitic information that must be loaded is significantly decreased since the netlist has been reduced to include only I/O-related logic. This provides significant advantages, as in the past, users would often limit analyzing SI effects because the large amount of SPEF data would render the process far too slow and cumbersome. To compensate for this, users would use very pessimistic derates 106. This would allow for timing closure at sign off, but would also lead to slower designs than necessary. Thereafter, in step 714, the STA is performed on the I/O within the active zone. Because the netlist has been significantly reduced in size, STA will be much faster.

Because all the I/O nets are available for MMMC and SMMC STA using the teachings described herein, accurate signal integrity analysis can be performed on all I/O nets using actual timing windows and slew information. For I/O nets that are coupled to internal nets (i.e., non-I/O nets), however, the exact timing window information would not normally be available. When loading the parasitic information during step 712, one can ensure that the relevant information for these internal nets is included. To do so, the parasitic information will assume an infinite timing window and a preselected default slew for these internal nets. This ensures that the impact of internal nets on the I/O STA is calculated during the I/O MMMC and SMMC STA.

Figure 8:
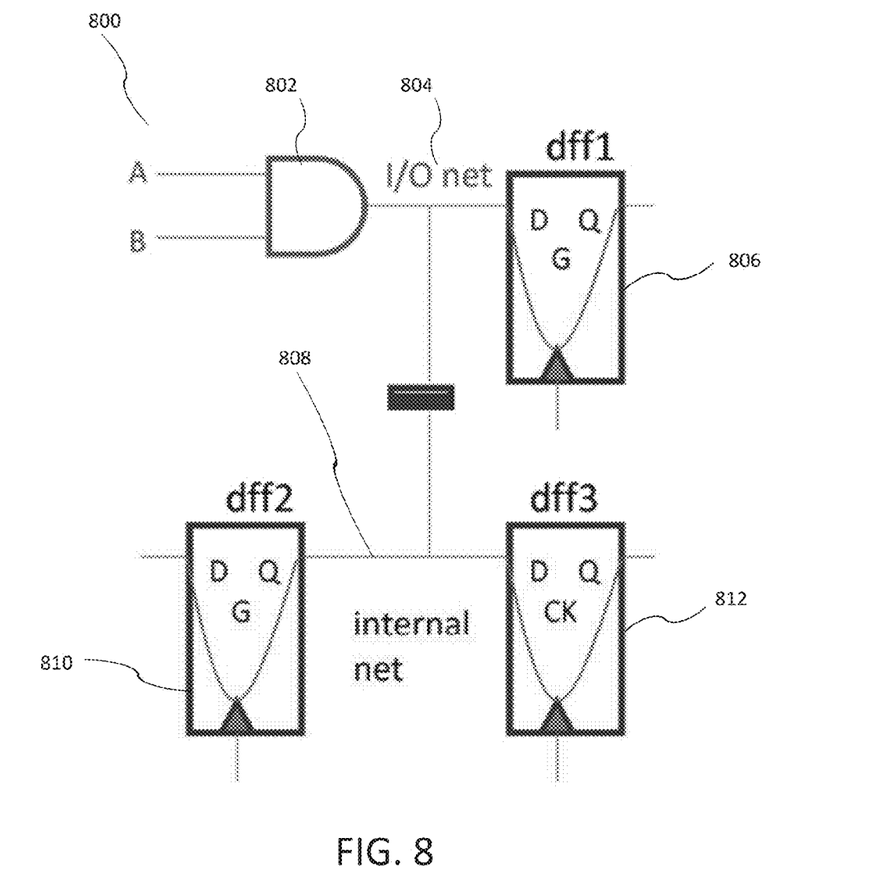
FIG. 8 shows a circuit where an I/O net is also in communication with an internal net of a circuit design.

FIG. 8 shows an example of circuit 800 with an I/O net that is coupled to an internal net. In particular, inputs A and B are coupled to an AND gate 802. AND gate 802 is connected to Flip Flop 806 through I/O net 804. I/O net 804 is also connected to an internal net 808. Internal net 808 is not part of any I/O path since it is not located between an input or output port and the input to a register. In the example shown in FIG. 8, internal net 808 is between the output of Flip Flop 810 and the input to Flip Flop 812. The timing of signals sent of I/O net 804 will be affected by the signals on internal net 808. Thus, the timing window and slew information in the SPEF information for internal net 808 should be set to infinite and default, respectively.

The various embodiments described herein provide several advantages over prior practice. By defining the active zone for STA to include only input/output modes, a user will be able to perform more complete static timing analysis. For example, because STA is only performed on various I/O modes, a user will be able to obtain an accurate analysis of I/O coupled nets. By segregating I/O and full design MMMC STA, challenges associated with the full design's MMMC STA are alleviated. For example, currently users will usually only perform selective signal integrity analysis, thus performing STA for few modes and the remaining modes, applying guard bands (derates) and thus only performing pessimistic analysis. The various embodiments described herein where I/O STA is segregated from full chip STA results in more accurate timing closure, which relies on less pessimism, and therefore may avoid a design change due to STA providing timing results that are worse than what would actually be experienced.

Moreover, currently users add pessimism to the parasitic SPEF data to take signal integrity issues into account during STA. In particular, clock networks are of particular concern during STA and are therefore handled with special focus since clock networks drive all the logic in a user's design. Thus, users currently clean up clock networks for doing SI analysis, which means adding extra pessimism to the complete data network. Because the I/O networks of interest have been segregated from the full design, most of the logic (i.e., register-to-register logic) has been removed. Thus, signal integrity of the clock itself need not be performed since segregated I/O allows computation of SI effects.

Moreover, General user expectation is not to analyze reset/scan logic in I/O specific modes which further reduces the scope of active logic zone and hence further bolsters the performance benefits of this solution. This is due to the fact that reset/scan logic generally comprises a significant portion of a design, but is not part of the I/O network. Performing STA in the I/O network, where reset/scan logic is not included as part of the active zone of the STA significantly improves performance. Note that STA for reset/scan logic can be performed during a STA run for the functional portion of a design.

In sum, because the MMMC STA is performed on the I/O network, timing analysis is much faster, and also allows for more complete analysis of the I/O network than would be possible if MMMC STA is performed on the entire design. Moreover, focusing on only the I/O network allows a user to perform timing optimization and design changes on timing violations that are caused by the I/O network, something that was not typically done in the past because the I/O STA generally set the derates, parasitic information, timing slack, constraints, etc. to worst case.

Experience suggests that the embodiments described herein provide significant advantages over prior methods of performing MMMC STA. The inventors believe the current cost of an additional analysis view ranges from 20% to 40% in terms of runtime and memory. It is believed that segregating the I/O nets from the full design will reduce between fifty and eighty percent of the logic used in a circuit design. Segregation therefore potentially allows the capacity of a system to increase by 3× to 8× depending on the design context. In other words, runtime and memory usage improves significantly.

For example, if one assumes that a MMMC STA run will analyze over twenty corners, it will not be possible to run all corners in a concurrent session due to high memory requirements. Segregating the I/O nets from the full design will allow concurrent sessions of all corners since the system will use less memory than a full MMMC STA. This improves flexibility for the user since static timing analysis can be performed for multiple corners in a single run.

Although the embodiments have been described with reference to the drawings and specific examples, it will readily be appreciated by those skilled in the art that many modifications and adaptations of the apparatuses and processes described herein are possible without departure from the spirit and scope of the embodiments as claimed hereinafter. Thus, it is to be clearly understood that this description is made only by way of example and not as a limitation on the scope of the claims.

We claim:

1. A computer implemented static timing analysis method for input/output modes of an integrated circuit design, comprising:
   loading the integrated circuit design into a memory of a computing device, wherein the integrated circuit design is described in a hardware description language;
   receiving an active set of input ports and an active set of output ports;
   defining an active zone of the integrated circuit design, the active zone comprising logic and interconnect between the active set of input ports, the active set of output ports and a selected level of sequential logic elements upstream from the active set of input ports and downstream from the active set of output ports, and which excludes functional logic between the selected level of sequential logic elements upstream from the input port and downstream from the output port;
   generating a description of the active zone using the hardware description language; and
   running a static timing analysis on the logic of the active zone; and
   performing timing signoff.

2. The method of claim 1, wherein the generating step comprises modifying the integrated circuit design by deleting interconnect and logic that are not within the active zone.

3. The method of claim 1, wherein the generating step comprises ignoring interconnect and logic that are not within the active zone.

4. The method of claim 1, further comprising selecting one of the plurality of input/output ports of the integrated circuit design to be analyzed.

5. The method of claim 1, further comprising loading timing data only for the active zone into the memory of the computing device, wherein the timing data comprises parasitic information and user constraints.

6. The method of claim 1, wherein the selected level of one or more sequential elements comprises the first one or more sequential elements nearest of the active set of input ports and the active set of output ports.

7. The method of claim 1, wherein the active set of input ports comprises an input port that is a first point in a timing path and comprises a first sequential element that is an endpoint of the timing path.

8. The method of claim 1, wherein the active set of input ports comprises an input port that is a first point in a timing path and comprises a first sequential element and a second sequential element, where the second sequential element is an endpoint of the timing path.

9. The method of claim 1, wherein the active set of output ports comprises an output port that is an endpoint in a timing path and comprises a first sequential element that is a starting point of the timing path.

10. The method of claim 1 wherein the static timing analysis comprises a multi-mode, multi-corner static timing analysis.

11. The method of claim 1 wherein the static timing analysis comprises a single-mode, multi-corner static timing analysis.

12. A system that performs static timing analysis on input/output modes of an integrated circuit design, comprising:
   a workstation comprising a central processing unit and memory that stores an integrated circuit design, wherein the integrated circuit design is described in a hardware description language, the central processing unit programmed to:
      receive an active set of input ports and an active set of output ports;
      define an active zone of the integrated circuit design, the active zone comprising logic and interconnect between the active set of input ports, the active set of output ports and a selected level of sequential logic elements upstream from the active set of input ports and downstream from the active set of output ports, and which excludes functional logic between the selected level of sequential logic elements upstream from the input port and downstream from the output port;
      generate a description of the active zone using the hardware description language;
      run a static timing analysis on the logic of the active zone
      perform timing signoff.

13. The system of claim 12, wherein the central processing unit is programmed to delete the interconnect and logic of the integrated circuit design that are not within the active zone.

14. The system of claim 12, wherein the central processing unit is programmed to ignore interconnect and logic that are not within the active zone.

15. The system of claim 12, wherein the central processing unit is programmed to load timing data only for the active zone into the memory of the workstation, wherein the timing data comprises parasitic information and user constraints.

16. The system of claim 12, wherein the selected level of one or more sequential elements comprises the first one or more sequential elements nearest the active set of input ports and the active set of output ports.

17. The system of claim 12, wherein the active set of input ports comprises an input port that is a first point in a timing path and comprises a first sequential element that is an endpoint of the timing path.

18. The system of claim 1, the active set of input ports comprises an input port that is a first point in a timing path and comprises a first sequential element and a second sequential element, where the second sequential element is an endpoint of the timing path.

19. The system of claim 12, wherein the active set of output ports comprises an output port that is an endpoint in a timing path and comprises a first sequential element that is a starting point of the timing path.

\* \* \* \* \*